Aug. 29, 1972     R. I. ZALLES     3,687,821
SELF-COOLING CONDENSING APPARATUS AND METHOD
Filed Feb. 24, 1970     3 Sheets-Sheet 1

Aug. 29, 1972   R. I. ZALLES   3,687,821
SELF-COOLING CONDENSING APPARATUS AND METHOD
Filed Feb. 24, 1970   3 Sheets-Sheet 3
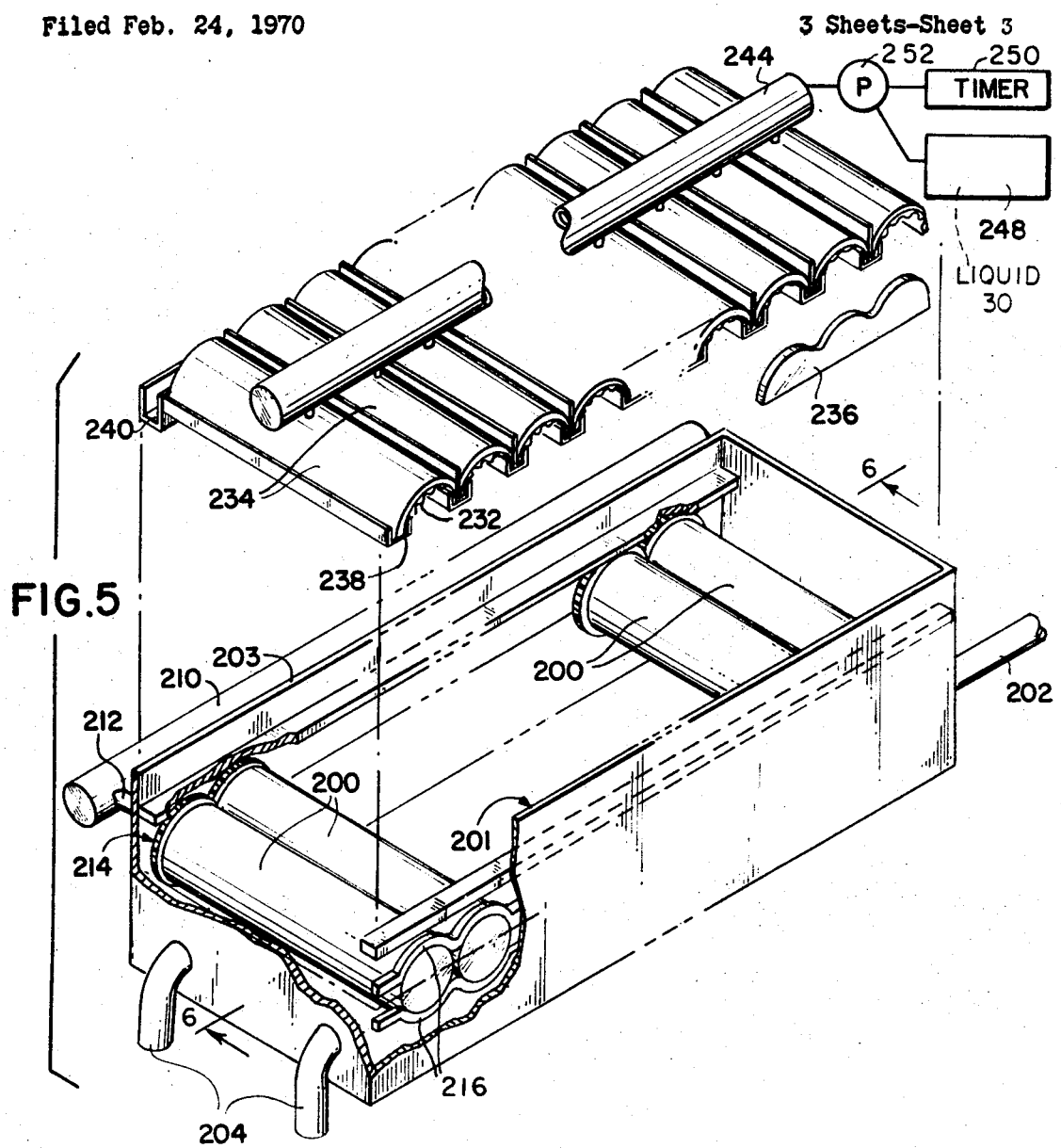
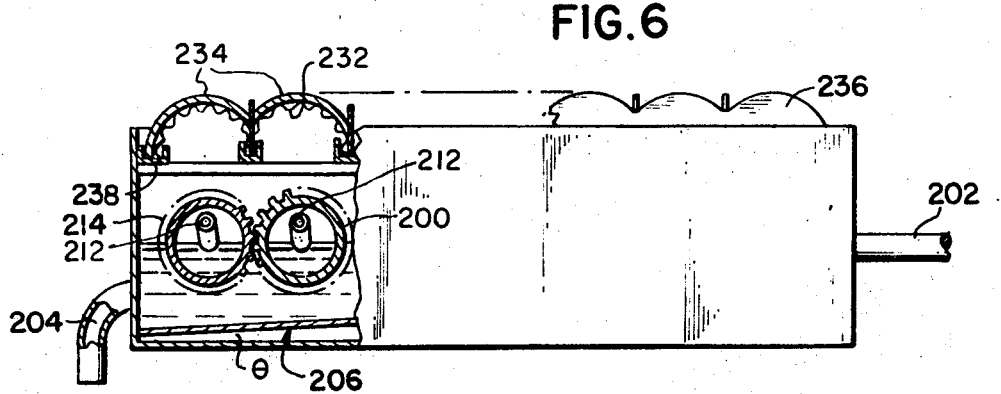

United States Patent Office 3,687,821
Patented Aug. 29, 1972

3,687,821
SELF-COOLING CONDENSING APPARATUS AND METHOD
Robert I. Zalles, Lima, Peru, assignor to The Yarnall Atlantic Company, Ltd., Nassau, Bahamas, British West Indies
Continuation-in-part of application Ser. No. 639,896, May 19, 1967. This application Feb. 24, 1970, Ser. No. 13,448
Int. Cl. B01d 1/00
U.S. Cl. 203—86
17 Claims

ABSTRACT OF THE DISCLOSURE

An apparatus and method for condensing a vapor being carried by a gaseous fluid in which the fluid and vapor are passed through a thermally conductive surfacing material having a large number of apertures but still presenting a large condensing area. The surface is maintained at a temperature lower than that of the fluid. A fiber mat is placed on the downstream side of the condensing surface, the fiber mat having been previously wetted with purified condensate, and the gaseous fluid being in fully saturated condition, such that upon hitting the condensing surface the fluid will have its temperature lowered and consequently deposit excess condensate on the surface. The deposit of the condensate has the effect of raising the temperature of the gaseous fluid to and beyond its initial temperature. This increase in temperature causes the fluid to become unsaturated. The unsaturated fluid passes through the apertures in the condensing surface and into the fibrous material, where it absorbs a quantity of previously purified condensate. The absorption of the purified condensate by the fluid again lowers the temperature below the temperature of the fluid at the condensing surface. Lowering the temperature will cause the gaseous fluid to deposit additional condensate within the fibrous material.

CROSS REFERENCE TO RELATED APPLICATION

This is a continuation-in-part of United States application, Ser. No. 639,896, filed on May 19, 1967, by Robert I. Zalles, now Pat. 3,505,175.

BACKGROUND OF THE INVENTION

This invention relates to an apparatus and method for condensing liquid and more particularly to an apparatus and method for rapidly and economically condensing liquid without the addition of substantial quantities of energy to cool the gaseous fluid carrying the condensate. The present invention is particularly suited for operation with the molecular evaporator disclosed in the copending application No. 639,896 referred to above. However, although the condenser forms an ideal combination when used in conjunction with the molecular evaporator to provide a simple, low-cost, low-energy consuming process for purifying liquid, it is evident that the condenser can perform without the evaporator and is of general applicability. The invention is particularly adapted for use in the recovery of industrial waste, the desalinization of sea water, and the purification of liquids.

The prior apparatus and methods for condensing gaseous fluids carried by carrier gases had a number of distinct disadvantages. In particular, many of the prior systems were extremely inefficient and required a great deal of energy in order to yield a condensate. In marginal cost operations and especially in areas where electricity or other forms of energy were expensive, the quantity of condensate obtainable heretofore was unsatisfactory when viewed in relation to the energy expended to obtain the condensate. It was further objectionable that there was great difficulty in obtaining liquids of high purity, especially when high purity was required on an industrial mass production scale. In addition, several types of condensing systems previously employed exhibited difficulties in continuously condensing a gaseous fluid without flooding or becoming inoperable at high flow rates.

BRIEF DESCRIPTION OF THE INVENTION

The instant invention comprises an apparatus and a method of entropic heat exchange to condense a vapor carried by a gaseous fluid, the vapor having been previously evaporated into the fluid, without the addition of further energy to cool the condensing apparatus. The condenser operates on the principle that condensation will occur when the temperature of a gaseous fluid is reduced below the temperature which corresponds to the saturation point temperature for the particular gaseous fluid and the vapor which it is carrying. The invention contemplates an apparatus comprising a thermally conducting condensing surface with a plurality of apertures to allow the fluid to pass through it while providing sufficient surface to allow condensate to form on it. The gaseous fluid is directed toward the plate at a temperature corresponding to a saturated condition. A fibrous material is disposed on the downstream side of the condensing surface. The fibrous material has been previously wetted with purified condensate. The gaseous fluid, upon hitting the condensing surface, becomes unsaturated. When this gaseous fluid passes through the fibrous material, the gaseous fluid absorbs some of the condensate. As the condensate is absorbed, it will cool the fibrous material, and since the fibrous material is in contact with the conductive surface, the temperature of the surface will decrease.

As the saturated gas impinges on the thus cooled surface of the plate, the gas will be cooled and therefore become super-saturated. To achieve equilibrium, the gas will deposit a quantity of the vapor on the surface. This will raise the temperature of the gas causing it to become unsaturated. The gas will then pass over the fibrous material which has been wetted and, because the gas is unsaturated, will absorb sufficient quantities of the purified condensate to become saturated once again. But this absorption will cool the fibrous material and consequently will force the gaseous fluid to a lower temperature, thereby lowering the saturation level of the gas and causing it to exit having absorbed less condensate than it has deposited on the condensing surface.

One general object of this invention is to provide a novel and improved apparatus and method for condensing a gaseous fluid which is efficient and consumes less energy than prior apparatus.

It is another object of this invention to provide a condenser capable of condensing large quantities of material at industrial rates.

It is still a further object of this invention to provide a condensing apparatus and method which yields a high purity condensate.

A further object of this invention is to provide a condensing means which can be employed in a purification apparatus.

BRIEF DESCRIPTION OF THE DRAWINGS

The present invention and further objects and features thereof will be understood more clearly and fully from the following description of certain preferred embodiments when read with reference to the accompanying drawing in which:

FIG. 5 is a diagrammatic perspective view, partly in section, of an apparatus in accordance with a further embodiment of the invention which is suitable for the industrial condensing of vapor carried by gaseous fluid;

FIG. 6 is a sectional view taken substantially along line 6—6 of FIG. 5.

DETAILED DESCRIPTION OF CERTAIN PREFERRED EMBODIMENTS

Figure 2A:
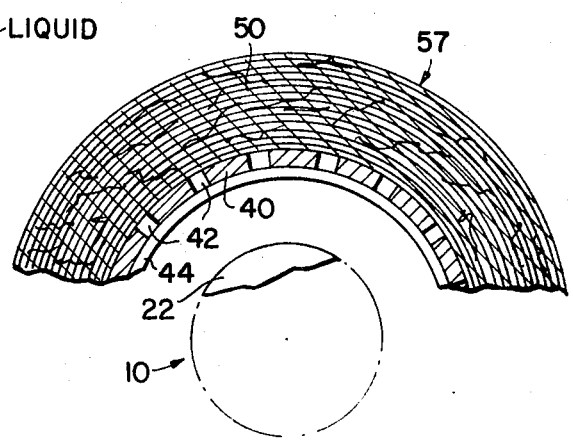
FIG. 2A is a fragmentary sectional view of the apparatus taken along line A—A of FIG. 2.

To falicitate the detailed description of the various embodiments of the invention illustrated in the drawings, there will first be given a brief summary of what are believed to be some of the physical principles invloved. That is, before describing the construction and mode of operation of representative condensing apparatus and attendant evaporators in accordance with the invention, the thermal and related effects of the apparatus on the gaseous fluid will be discussed.

Figure 1:
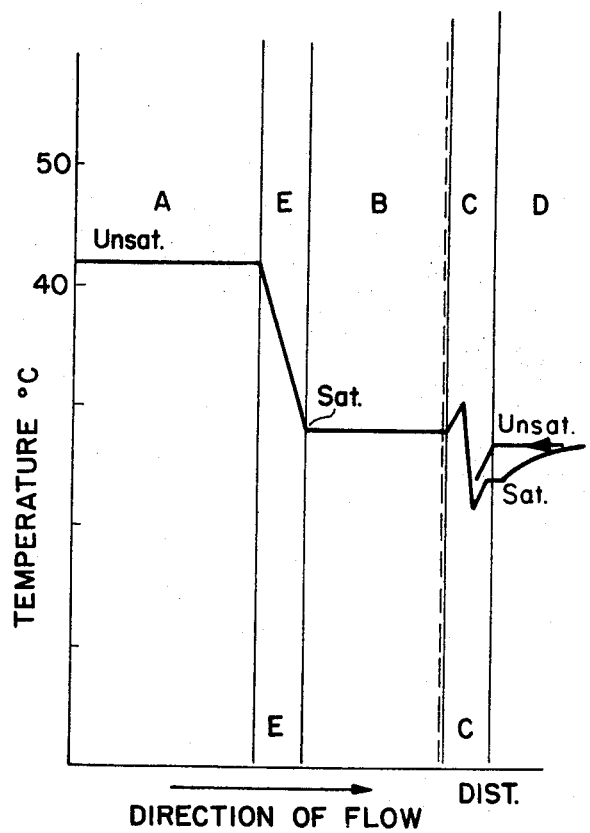
FIG. 1 is a plot of temperature (T) versus distance (D) and the general entropic changes which result in a condenser in accordance with the invention.

Referring to FIG. 1 there is shown a graphical representation of the temperature versus distance or passage of the gaseous fluid through an evaporator section E and a condenser section C. The evaporator section can be of any design. However, in the embodiments herein discussed the evaporator will be one which is so designed as to provide optimum evaporation in conjunction with the condenser design.

Section A of the graph shows the temperature for a gaseous fluid being passed from an input source to the beginning of the evaporator. The gas is at a temperature such that it is unsaturated and illustratively is at about 40° C. As the gas passes through the evaporator, the liquid to be evaporated is concurrently dispersed over the evaporation surfaces in a manner more fully described in the copending United States patent application referred to above. For example, evaporation essentially takes place at the surface of the liquid, and the gaseous fluid is passed over as broad a surface as possible. As the liquid becomes vaporized and is absorbed by the fluid, the temperature of the fluid is accordingly lowered, because evaporation is basically a cooling process. This heat loss corresponds to zone E in the graph. By properly choosing the distance over which the gaseous fluid is passed as a function of the nature of the gaseous fluid and the nature of the evaporate, the gaseous fluid will be fully saturated with evaporate and upon exiting from the evaporator structure will be at a temperature lower than its incident temperature.

Shortly after leaving the evaporator structure, the gaseous fluid comes into contact with the condensing surface of the condenser. A fibrous backing which has been previously wetted with a previously condensed distillate is in intimate contact over the entire rear face of the condensing surface. Because the backing has been wetted, a certain amount of evaporation of the distillate takes place, and this will tend to cool the backing and hence the condensing surface with which it is in contact. Therefore, when the gaseous fluid comes into contact with the condensing surface, the fluid immediately gives up a portion of its vapor because the condensing surface is at a lower temperature than the saturated gaseous fluid. This condensation accordingly causes the temperature of the gaseous fluid to increase, as shown at the interface of zones B and C in FIG. 1, thereby causing it to become an unsaturated fluid. The unsaturated fluid is then passed through the fibrous structure in its unsaturated state.

As the unsaturated gaseous fluid passes through the fibrous structure, the fluid absorbs a quantity of previously condensed distillate which is used to wet the fibrous structure. In absorbing this wetting liquid, the fluid lowers the temperature of the fibers and cools them below the original impinging temperature of the gas. The drop in temperature of the fibers is transmitted to the thermally conducting surface to keep it in a continuously cooled state. As the surface temperature drops, the temperature and hence the saturation point of the gaseous fluid striking the surface also decreases. As the saturation point decreases, an additional amount of its vapor is condensed within the fibers. This provides the self-wetting cooling feature of the invention.

Just prior to exiting from the fibrous material, an equilibrium will be established such that the gaseous fluid will rise in temperature to a point where it will be saturated. When the gaseous fluid leaves the condenser, it comes in contact with the ambient atmosphere, which is at a higher temperature than the fluid. The temperature of the fluid increases accordingly, and the gaseous fluid attempts to reach that temperature and it becomes unsaturated.

Figure 2:
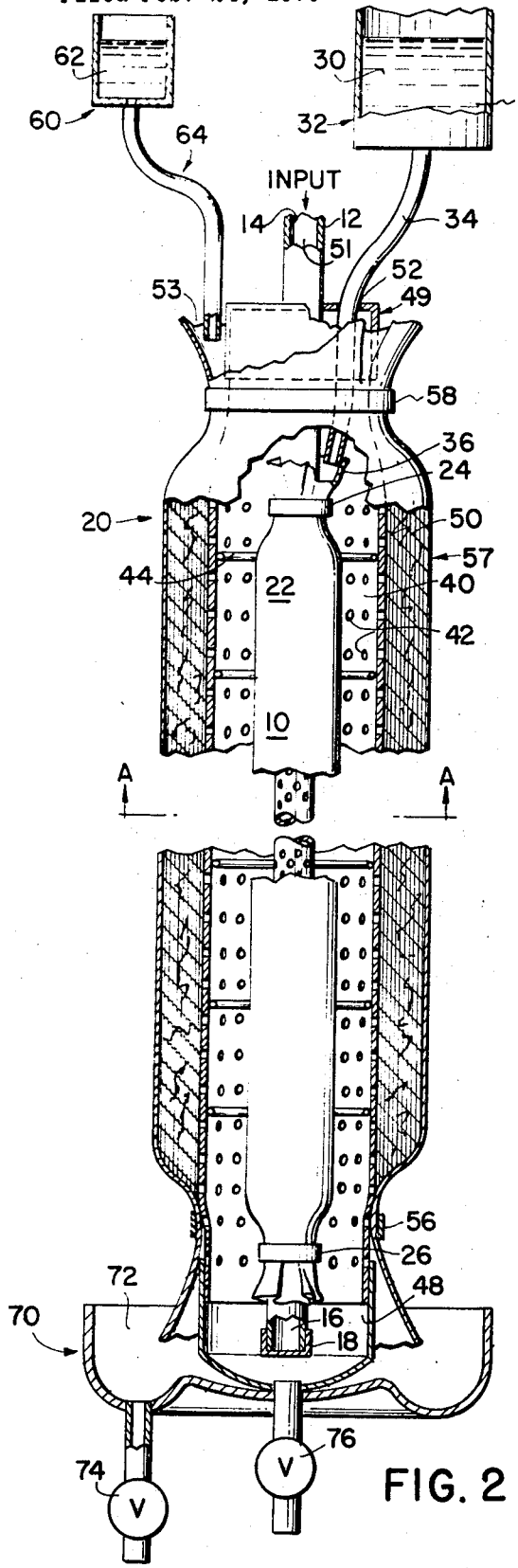
FIG. 2 is a diagrammatic view, partly in section of one embodiment of a condensing apparatus in accordance with the invention which is suitable for carrying out the method of the invention.

Referring now to FIG. 2, there is shown one embodiment of the condensing structure operated in conjunction with a cylindrical evaporator. It is to be understood that the method of evaporation and the particular evaporator structure employed in the embodiment can be altered or modified to meet a given situation and that equivalent evaporators can be employed in conjunction with the condenser.

The evaporator is generally designated as 10 and comprises a tubular input element 12 which is coaxial with the condenser generally labeled 20. The tubular element 12 has an input end 14 and an output end 16. The output end is capped by a closure 18 to prevent the exiting of gaseous fluid from the tubular element in that direction. The tubular element is inserted within the condenser structure 20 and contains a plurality of holes in the zone between clamps 24 and 26.

The evaportor 10 includes a fibrous absorbent layer 22 which encircles the perforated tubular member 10 along its entire perforated length. The fibrous absorbent layer 22 is not in contact with the perforated tubular element over most of the tubular element's length, but rather is sufficiently distant to permit the free flow of gaseous fluid therethrough.

An upper clamp 24 and a lower clamp 26 are placed one at either end of the absorbent fibrous layer 22. The liquid 30 to be treated is stored in a receptacle 32. A tube 34 connects the receptacle 32 to the evaporator structure 10. Specifically the fibrous material 22 when clamped presents a flared structure 36 formed by the edges of the fibrous material. Tube 34 is placed within the cup-like structure 36 to allow liquid in process to distribute itself within the cup-like structure and thereby be absorbed by the absorbent fibrous layer 22.

The condenser 20 comprises a hollow cylinder 40 of thermally conductive material which is disposed concentrically with the tubular structure of the evaporator 10. The cylinder 40 has a plurality of apertures 42. The apertures should be in sufficient number to allow the gaseous fluid which comes from the evaporator to pass through the inner structure of the condenser. However, the apertures must not be so numerous as to deprive the gaseous fluid of an effective condensing surface.

In one embodiment the apertures form a cylindrical series of rings, each coaxial with the center of the thermally conducting cylinder and each parallel to one another and perpendicular to the longitudinal axis of the cylinder. A number of circular ribs 44 are disposed within the conducting cylinder at a given distance from one another so as to provide reinforcement to the thermally conducting material and prevent it from collapsing.

A mat 50 of fibrous material surrounds the thermally conducting cylinder 40 and extends a distance above and below the thermally conducting cylinder. A cap 48 seals the thermally conducting cylinder at the end corresponding to the capped evaporator end 16, and a baffle 49 seals the other end of the cylinder. A central opening in the baffle 49 allows the tubular element 12 to enter into the cylinder. The gaseous fluid is admitted to the evaporator structure 10 through a central passage 51 in the element 12, while an aperture 52 in the baffle 49 allows the passage of liquid to be treated to the evaporator structure 10. Ring clamps 56 and 58 are each disposed at a point near the longitudinal extremities of the mat 50 of fibrous material and serve to clamp the mat to the thermally conducting cylinder 40. This prevents gaseous fluid from escaping from underneath the fibrous material.

A tank 60 containing purified liquid 62 is connected by means of a tube 64 to the upper portion of the condenser 53. As was true with the evaporator structure, the clamp 58 which holds the mat 50 of fibrous material to the thermally conducting cylinder 40 forces the fibrous material 50 to assume a flared shape 53. By depositing some of the purified condensate 62 into the flared end 53, it will be transmitted downwardly by the force of gravity through the fibrous material to thoroughly wet it.

A scupper 70 is rovided at the lower end of the condenser structure. The scupper 70 has a cross sectional area which is larger than the cross section of the condenser 20. The scupper 70 is provided with a stop cock 74 for draining off purified condensate 72 which accumulates in the scupper 70. A second stop cock 76 is provided and passes through the scupper 70 and through the cap 48 of the thermally conducting cylinder 40. This allows liquid in process which was not evaporated to be drawn off periodically to maintain an operating condition in the condenser structure.

Figure 3:
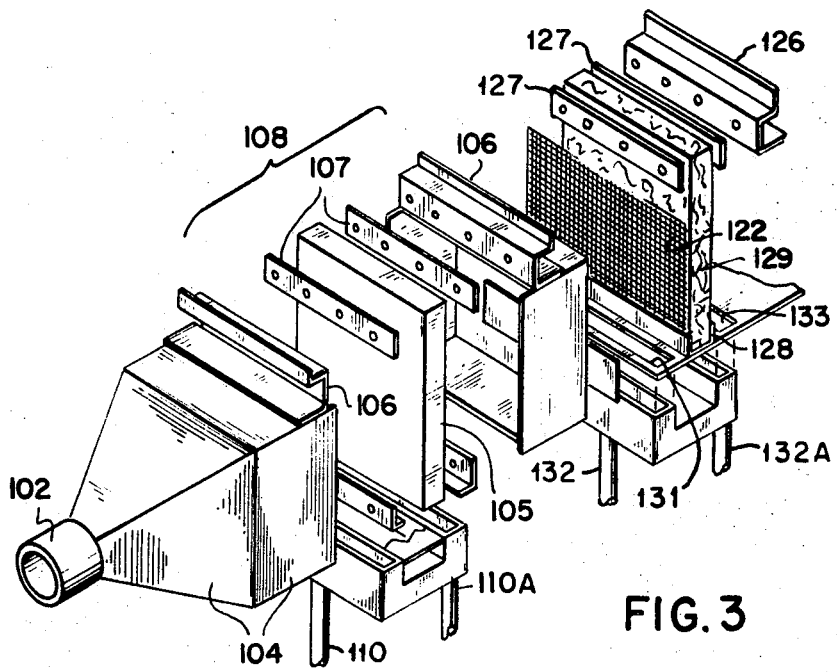
FIG. 3 is an exploded perspective view of another embodiment of a condenser in conjunction with an evaporator unit.
Figure 4:
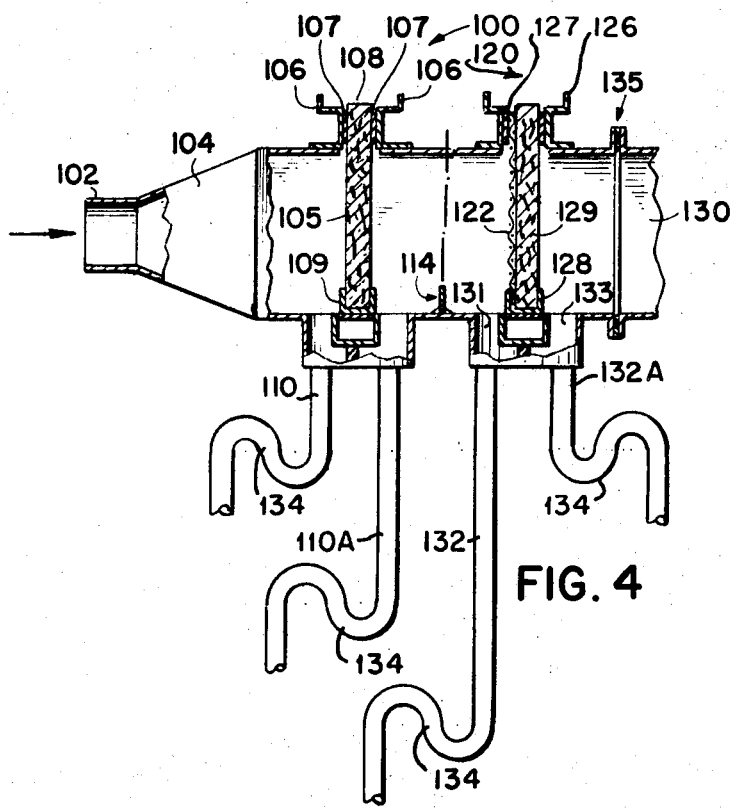
FIG. 4 is a sectional view taken along line 4—4 of FIG. 3.

Referring now to FIGS. 3 and 4, there is shown a condenser 120 according to another illustrative embodiment of the instant invention in conjunction with an evaporator generally designated 100. An input duct 102 of substantially cylindrical configuration is attached to a substantially larger housing 104. A rectangular plate 105 of absorbent fibrous material having a width substantially equal to the width of the housing and a length greater than the height of the housing such that the plate protrudes from the upper wall of the housing is disposed transverse to the direction of flow of the gaseous fluid. The portion of the plate 105 of fibrous material which protrudes from the upper section of the evaporator is surrounded by support walls 106 parallel to one another to hold the plate 105 of absorbent material upright. These plates form a trough section 108 to provide a receptacle for liquid to be treated.

Liquid in process is deposited in the trough 108 and is absorbed by the plate 105. As the gaseous fluid hits the plate 105 of absorbent fibrous material two phenomena occur. First the gaseous fluid absorbs part of the liquid to be treated. By so doing it effectively evaporates that liquid causing the temperature of the area immediately surrounding the evaporated liquid to be lowered. As the temperature of the material becomes lower, the temperature of the gaseous fluid passing through the material is also lowered. By properly dimensioning the fibrous material, it is possible to obtain a temperature gradient such that the gaseous fluid exiting from the fibrous material 105 will be at a temperature lower than the temperature of the fluid when the fluid entered and the fluid will contain sufficient liquid in process to be completely saturated.

Separate drains 110 and 110A are provided on either side of the plate 105 of absorbent fibrous material to collect the heavier liquid to be treated which has had some of its liquid evaporated and hence is more concentrated, thus tending to flow to the bottom by the force of gravity. Trap 134 is provided as a liquid seal to prevent the gaseous fluid from escaping through the drain and thus bypassing the evaporator element on the incident side and the condenser element on the discharge side. Similarly, separate drains 132 and 132A and liquid seal traps 134 are provided to draw off the condensate without permitting the saturated gaseous fluid to escape through the drains and thus bypass the condenser element.

A seal 107 is inserted between parallel supports 106 andt he plate 105 of fibrous material to effectviely create a gas-tight seal thereby preventing any of the gaseous fluid from escaping and eliminating the possibility that any gaseous fluid from the atmosphere might enter the evaporator structure. A lower sealing structure 109 which is substantially U-shaped to accommodate the entire thickness and the entire length of the plate 105 of fibrous material is inserted across the width of the lower wall of the housing 104 to prevent escape of the gaseous fluid from underneath the fibrous material.

The gaseous fluid in a saturated state passes from the evaporator structure 100 to the condenser structure 120. A screen 122 of thermally conducting material is disposed approximately normal to the direction of flow of the gaseous fluid. A mat 129 of fibrous material which has been previously wetted is in intimate contact with and downstream of the screen 122 of thermally conducting material. The screen 122 of thermally conducting material and mat 129 of fibrous material are held in intimate contact by a lower trough shape member 128, which is disposed along substantially the entire lower width of the condenser. The member 128 also provides a seal between the screen 122 of thermally conducting material and the outer walls of the housing 104. A seal 127 is inserted between parallel supports 126 and the mat 124 of fibrous material. The only effective route which the gaseous fluid can take is through the conducting screen 122 and mat 129 of fibrous material and into exhaust duct 130.

Trapped drains 132 and 132A having traps 134 are disposed such that there is an opening of the drain on either side of the fibrous material. This allows the collection of the condensate both from the thermally conducting condensing surface 122 and from the fibrous material 124 through opening 131 and 133 respectively. The condensing apparatus may be, if necessary connected to an exhaust duct 130 by means of a rubber gasket 135 to effect a seal between the condenser structure 120 and the exhaust pipe 130.

Employing FIG. 2 by way of illustration, the operating principles of the self-cooling condenser can be detailed while discussing the operation of one of the embodiments. Condensation is the reverse of evaporation and takes place only at the surface of a material. If a surface can be constantly cooled, condensation can be a continuous process because the equilibrium normally established by the deposition of a condensate on the surface will necessarily be counteracted by the constant cooling of the surface. By taking an unsaturated gaseous fluid and evaporating a liquid which is to be purified into a stream of the unsaturated gaseous fluid, the fluid will absorb the liquid. However, since evaporation by absorption is essentially a cooling process, the gaseous fluid will accordingly be cooled as it is being passed over the liquid to be purified. By properly choosing the distance over which the gaseous fluid is to be passed, the temperature of the gaseous fluid when it exits from the evaporator will have been sufficiently lowered by the evaporation process itself to have the gaseous fluid be in a fully saturated condition and concurrently have picked up a quantity of the liquid to be treated.

The gaseous fluid is then brought into contact with a condensing apparatus. This condensing apparatus includes a condensing surface and a wetted fibrous material in intimate contact with and on the downstream side of the condensing surface. The surface should be sufficiently thin to allow any change in temperature of the fibrous material to be quickly transmitted to the face of the surface which initially contacts the gaseous fluid. The output side of the fibrous material is in contact with the atmosphere.

Prior to starting the purification operation the fibrous material will be wetted with an amount of previously purified condensate. The atmosphere, being an infinite unsaturated area, will tend to evaporate the wetting condensate and thereby cool the fibers. This cooling at the fibers to a temperature below that of the gaseous fluid will in turn be transmitted to the surface of the conducting plate which first contacts the gaseous fluid and will cause its temperature to be lowered. The gaseous fluid is now passed through the evaporator and into the condenser structure. As the gaseous fluid hits the cooled perforated thermally conducting surface, part of its vapor will condense on the thermally conducting surface. This condensation will cause the formerly saturated gaseous material to be unsaturated for two reasons:

(1) it will have lost part of its condensate to the thermally conductive surface; and
(2) due to the heat of condensation, the temperature of the gaseous fluid will have risen; therefore, it will be unsaturated at the new higher temperature.

The gaseous fluid then passes through the apertures in the thermally conducting material and flows substantially transversely through the mat of previously wetted fibrous material. Because the gaseous fluid is no longer in a saturated condition, it will tend to evaporate the purified condensate on the fibers of the fibrous material. Accordingly, the fibers are cooled. This cooling results in two occurrences:

(1) the gaseous fluid moving past the fibers has its temperature lowered, and
(2) the heat of condensation from the thermally conducting surface is dissipated by the cooling effect of the evaporation occurring in the fibrous material.

The dissipation of heat from the thermally conducting surface maintains the surface at the cooling level required to condense the incident vapor. As the gaseous fluid continues to pass through the fibrous material, the material is maintained in its cooled conditioin, and the fluid yields additional amounts of vapor and forces the vapor to condense within the fibers. This condensation provides the self-wetting characteristic of the condenser. The material is wetted, and sufficient condensate accumulates within the fibers to yield a drainoff as a recoverable product.

As the gaseous fluid exits from the fibrous material, the fluid comes into contact with the ambient atmosphere and accordingly has its temperature slightly raised. The raising of the temperature of the gaseous fluid causes the fluid to be in an unsaturated condition, and as it exits from the mat of fibrous material it evaporates surface fluid from the output side of the material. This evaporation cools the fibrous material and reinitiates the entire cycle.

Referring now to FIG. 5 and FIG. 6, there is shown a multi-stage condenser unit particularly adapted for use in processing large quantities of fluids to be treated and providing a large amount of condensate. A plurality of evaporators, generally labeled 200, are inserted in a large open tank 201 of rectangular cross-section. The tank 201 includes at least one input port 202 and a plurality of output ports 204. The tank advantageously has a slanted floor 206, such that the port corresponding to the output end of the tank is at a lower level than the lowermost corner corresponding to the input end of the tank, and is at an angle from the horizontal. A sufficient number of evaporators are disposed within the tank, all of the same length and preferably of a length substantially equal to the width of the tank, to cover the entire horizontal surface of the tank. Liquid in process is allowed to flow into the tank by means of input port 202. The level of the liquid in the tank is such that only half of the circumference of each of the evaporators is submerged. A manifold 210 runs parallel to the length of the tank and has a plurality of gas-tight ducts 212 such that one duct enters into each of the evaporator units. The ducts deliver gaseous fluid to the evaporators and are so arranged as to supply gaseous fluid at a substantially equal pressure to all evaporator units.

Rotational couplings 214 are affixed to one end of each evaporator and mesh with one another. All of the rotational couplings 214 are located parallel to and in close juxtaposition to one of the lengthwise vertical walls of the tank. The rotational couplings 214 are situated such that successive evaporator units can be rotated in opposite directions. By turning any single evaporator unit either manually or otherwise, the remainder of the evaporators will be forced to rotate about their longitudinal axes. The ends of each evaporator opposite the ends affixed to the rotational couplings are attached to a rotational collar 216 affixed to the inside of the vertical lengthwise side of the tank 201 opposite the side 203 nearest the rotational couplings 214. Periodically, the evaporators are rotated about their longitudinal axes to prevent build-up of particles within the fiber structure of the evaporator.

As liquid to be treated is evaporated by means of the evaporator structure, the liquid tends to become more concentrated, and as more liquid is evaporated, the heavier impurities will tend to flow along the floor 206 of the tank 201 towards the exit ports 204. The concentration of the heavier impurities along the floor allows fresh liquid in process to remain at the top of the liquid in the tank while forcing more concentrated liquid in process to settle out.

The condenser structure includes a plurality of generally curved condenser plate sections 232 inserted over the tank 201. In the embodiment illustrated in FIGS. 5 and 6, the sections 232 have a semicircular cross-section, although in other embodiments the sections may be parabolic or have other arcuate configurations. The sections 232 are perforated and are fabricated from thermally conducting material. Overlaid on each curved condenser plate 232 is a layer 234 of fibrous material intimately in contact over the entire outer surface of the curved condensing plate 232. The entire condenser structure is assembled such that there can be no leakage of gaseous fluid around the condenser structure.

A flat sealing section 236 having an outer peripheral edge of substantially the same shape as the contour of the condenser plate sections 232 is placed on each end of each condensing structure. The condenser structure should be at a sufficient distance above the surface of the liquid to be treated such that the flow of the vapor saturated gaseous fluid from the evaporators will impinge on substantially all points of the perforated thermal conducting sections 232 and traverse this surface into the fibrous layers of material at substantially the same rate of flow. A plurality of scuppers 238 are distributed across the width of the tank such that the longitudinal edges of the curved condenser surfaces rest in the scuppers. The scuppers 238 are arranged to permit flow into a trough 240 thereby allowing accumulation of condensate from the scuppers into a trough 240. A number of small pipes 244 are situated over the condenser assembly and have a plurality of apertures distributed along their length. The pipes are capped at one end, and the pipes are connected at their other ends to a supply of previously purified liquid 248. These pipes are connected to a timer 250 and a pump assembly 252 which periodically spray previously purified liquid over the condenser structure. Although the condenser has a self-wetting feature due to the condensation of vapor within the fibrous structure as shown by FIG. 1, the draining effect of gravity on the liquid condensing within the fibrous structure is such that, in the absence of the pipes 244, the uppermost portions of the fibrous structure may under some circumstances become dried. The pipes overcome any dryness by periodically moistening the fibrous structure to maintain it in a thoroughly wetted condition.

Once the desired degree of concentration of solubles is attained at the discharge end 204 of the tank 201, liquid in process is drawn off from that end at controlled rates. The liquid is continuously replaced by introducing fresh liquid to be treated into the tank. Since the liquid previously in the tank is more concentrated, it tends to go to the bottom and be drawn off, whereas the fresh liquid tends to remain on top. Periodically, all the evaporators are rotated 180° around their longitudinal axes, thereby submerging the upper portion and withdrawing the lower portion. This rotation results not only in cleaning out the previously upper portion of the evaporator structure, thereby reducing the incidence of clogging, caking, and crystal compaction on the fibrous material of the evaporator pads, while also keeping the upper part of the evaporator elements well wetted.

It is to be understood that the terms employed are merely illustrative and in no way meant to limit the range of equivalents which may be used within the scope and spirit of the invention, and particularly that the embodiments disclosed are in no way exhaustive of the various combinations of structural elements and process steps which utilize the inventive concept.

What is claimed is:

1. An apparatus for condensing a vapor as it moves along a flow path comprising a thermally conducting condensing member having a pair of opposed faces and a plurality of apertures extending through the member from one face to the other, one of said faces defining a large condensing surface, a layer of absorbent fibrous material in intimate contact with the other face of the thermally conducting member and disposed downstream of the first face of the thermally conducting member, said fibrous material being positioned with respect to the thermally conducting condensing member to cover substantially all of the apertures therein, means for saturating the vapor to be condensed, housing means for leading the saturated vapor into direct contact with said one face, a portion of the vapor passing through said apertures and said fibrous layer and being discharged downstream thereof, means for supplying previously purified condensate to the fibrous material layer, said fibrous material layer and said thermally conducting condensing member forming a condensing assembly, and means disposed in close proximity to, and on both sides of the condensing assembly to carry off condensate deposited on and within said condensing assembly, whereby the amount of deposited condensate is greater than the amount of previously purified condensate supplied to the fibrous material layer.

2. An apparatus for condensing a vapor as it moves along a flow path according to claim 1, further comprising means for introducing the vapor into the apparatus in a fully saturated condition at a temperature higher than the temperature of the thermally conducting condensing member.

3. An apparatus for condensing a vapor as it moves along a flow path, comprising a tubular evaporator element, means for feeding liquid to be purified to the evaporator element, to vaporize said liquid, a thermally conducting cylinder having a pair of opposed cylindrical faces coaxial with the evaporator element and having a plurality of apertures extending radially through the cylinder from one face to the other, the inner cylindrical face defining a large condensing surface disposed along substantially the entire length of the cylindrical thermally conducting member, a layer of fibrous material in intimate contact with the outer cylindrical surface of the cylindrical thermally conducting member and covering substantially all of the radially extending apertures therein, means for leading vapor from the evaporator element into direct contact with said inner cylindrical face and then through the radial apertures and the fibrous layer, means for continuously wetting the fibrous material layer, and condensate collecting means disposed in close proximity to the cylindrical member of thermally conducting material to carry off condensate deposited on the inner face of the member.

4. An apparatus for condensing a vapor as it moves along a flow path comprising a tubular evaporator element, means for feeding liquid to be purified to the evaporator element, to vaporize said liquid, a cylindrical thermally conducting condensing member coaxial with the evaporator element, the condensing member having a pair of opposed faces and having a plurality of apertures extending radially through the member from one face to the other, the inner face defining a large condensing surface, a layer of fibrous material in intimate contact with the outer face of the cylindrical thermally conducting condensing member, positioned so as to cover substantially all of the radially extending apertures, means for leading vapor from the evaporator element into direct contact with said inner cylindrical face and then through the radial apertures and the fibrous layer, a reservoir of previously purified condensate suitably connected to one end of the fibrous material layer to continuously wet the fibrous material layer, and a scupper having an area substantially greater than the cross-sectional area of the fibrous material layer and disposed at the other end of the fibrous material layer.

5. An apparatus for condensing a vapor as it moves along a flow path, according to claim 4, further comprising clamping means for securing the lateral extremities of the fibrous material layer securely to the cylindrical thermally conducting condensing member, and wherein the plurality of radially extending apertures are disposed in a substantially regular pattern.

6. Apparatus for condensing a vapor as it moves along a flow path, comprising a housing, a first layer of absorbent fibrous material disposed within said housing and protruding therefrom, means for feeding liquid to be purified to the protruding portion of said first layer, means within said housing for vaporizing said liquid and directing the vapor along said flow path, a member of thermally conducting condensing material having an outer peripheral silhouette substantially similar to the inner peripheral silhouette of the housing and disposed transverse to the flow path, having a pair of opposed faces and a plurality of apertures extending through the member from one face to the other, the upstream face defining a large condensing surface a second layer of absorbent fibrous material in intimate contact with the downstream face of the member of thermally conducting condensing material so as to substantially cover all of the apertures therein, means for continuously wetting the second layer of fibrous material, and means disposed in close proximity to the member of thermally conducting condensing material to carry off condensate deposited on the upstream face of the thermally conducting condensing member.

7. Apparatus for condensing a vapor as it moves along a flow path according to claim 8, further comprising means for providing a seal between the outer periphery of the member of thermally conducting condensing material and the inner periphery of the housing to prevent traversal of the housing by any gaseous fluid without passing through the member of thermally conducting condensing material and wherein the means for carrying off the condensate comprises a trapped U-trough situated on either side of the member of thermally conducting condensing material and the layer of fibrous material.

8. Apparatus for condensing a vapor as it moves along a flow path, comprising a housing, a plurality of tubular evaporator elements disposed within said housing in parallel relationship with each other, means for feeding liquid to be purified to each of the evaporator elements, to vaporize the same, a member of thermally conducting condensing material having a pair of opposed faces disposed transverse to the flow path and a plurality of apertures extending through the member from one face to the other, the upstream face defining a large condensing surface of substantially semicylindrical contour which forms one wall of the housing, a layer of fibrous material in intimate contact with the downstream face of the member of thermally conducting condensing material so to cover substantially all of the apertures therein, means for leading substantially fully saturated vapor from the evaporator elements into direct contact with said one face, then through the member of thermally conducting condensing material and then through the fibrous layer, the vapor being at a temperature above the temperature of the member of thermally conducting condensing material, means for continuously wetting the fibrous material, and means for collecting condensate disposed along the longitudinal extremities of the member of thermally conducting condensing material to carry off condensate deposited on the upstream face of the thermally conducting condensing material.

9. An apparatus for condensing a vapor as it moves along a flow path according to claim 8, wherein the means for continuously wetting the fibrous material comprises a reservoir of previously purified condensate and means for delivering a portion of the previously purified condensate to the layer of fibrous material.

10. Apparatus for condensing a vapor as it moves along a flow path according to claim 9, further comprising means for sealing the area between the housing and the member of thermally conducting condensing material to assure traversal of the housing by a gaseous fluid through the member of thermally conducting condensing material and wherein the means for collecting condensate comprises a substantially U-shaped trough having a length substantially similar to the length of the semi-cylindrical member of thermally conducting condensing material and disposed along the longitudinal edge of the member of thermally conducting condensing material.

11. An apparatus for condensing a vapor as it moves along a flow path according to claim 10, wherein the fibrous material is a material having a substantially random fiber configuration, each fiber being capable of providing a condensing surface for vapor, and wherein the means for continuously wetting the layer of fibrous material comprises a reservoir of previously purified condensate and means for delivering said previously purified condensate to the layer of fibrous material at a predetermined rate of flow.

12. A method for condensing vapor comprising the steps of advancing liquid to be purified to a fibrous evaporator element, evaporating the liquid to produce a vapor saturated gaseous fluid, directing the gaseous fluid at a first temperature through a member of thermally conducting condensing material, removing vapor from the gaseous fluid by condensing sufficient vapor on the thermally conducting member to bring the fluid to an unsaturated condition, passing the gaseous fluid through a fibrous member, wetting the fibrous member with liquid, to cause the gaseous fluid to reabsorb additional vapor, the reabsorption of the additional vapor cooling the fibrous material, transmitting the heat loss of the fibrous material to the thermally conducting member to maintain said member at a temperature lower than said first temperature, and recovering condensate from the thermally conducting member in an amount greater than the amount of liquid added to the fibrous layer.

13. A method for condensing vapor according to the claim 12, further comprising the steps of carrying off the condensate accumulated on the thermally conducting member and within the wetted fibrous material.

14. A method for condensing vapor comprising the steps of advancing liquid to be purified to a fibrous evaporator element, evaporating the liquid to produce a vapor, advancing the vapor along a flow path and into direct contact with a member of thermally conducting material disposed along said path, a portion of said vapor being condensed on said member, passing the remaining vapor through the thermally conducting member and then through a layer of fibrous material, wetting said layer with liquid, evaporating moisture from said layer as the vapor passes therethrough to lower the temperature of the vapor below its temperature at the time it contacts said thermally conducting member, transmitting the heat loss by the evaporation of moisture within said layer to said thermally conducting member to maintain said member at a temperature less than the temperature of the vapor being advanced into contact therewith, and recovering condensate from the thermally conducting member in an amount greater than the amount of liquid added to the fibrous layer.

15. A method for condensing vapor comprising the steps of advancing liquid to be purified to a fibrous evaporator element, evaporating the liquid to produce a vapor, directing the vapor along a flow path, advancing said vapor into direct contact with a member of thermally conducting material disposed along said path while maintaining the vapor at a first temperature, a portion of said vapor being condensed on said member, passing the remaining vapor through the thermally conducting member and then through a layer of absorbent fibrous material in intimate contact with said member, wetting said fibrous layer with a pure liquid of the same composition as the vapor, evaporating moisture from said layer as the vapor passes therethrough to lower the temperature of the vapor below said first temperature, transmitting the heat loss by the evaporation of moisture within said layer to said thermally conducting member to maintain said member at a temperature less than the temperature of the vapor being advanced into contact therewith, and recovering condensate from the thermally conducting member in an amount greater than the amount of pure liquid added to the fibrous layer.

16. A method for condensing vapor comprising the steps of directing gaseous fluid along a flow path, adding liquid to be purified to the fluid as it moves along said path to lower its temperature and form a vapor, advancing the vapor into direct contact with a member of thermally conducting material disposed along said path, a portion of said vapor being condensed on said member, passing the remaining vapor through the thermally conducting member and then through a layer of fibrous material, wetting said fibrous layer with a pure liquid of the same composition as the vapor, evaporating moisture from said layer as the vapor passes therethrough to lower the temperature of the vapor below its temperature at the time it contacts said thermally conducting member, transmitting the heat loss by the evaporation of moisture within said layer to said thermally conducting member to maintain said member at a temperature less than the temperature of the vapor being advanced into contact therewith, and recovering condensate from the thermally conducting member in an amount greater than the amount of pure liquid added to the fibrous layer.

17. A method for condensing vapor comprising the steps of directing unsaturated gaseous fluid along a flow path, adding liquid to be purified to the fluid as it moves along said path to saturate the same and lower its temperature, advancing the saturated fluid into direct contact with a member of thermally conducting material disposed along said path, a portion of the moisture within said fluid being condensed on said member, passing the remaining fluid through the thermally conducting member and then through a layer of absorbent fibrous material in intimate contact with said member, wetting said fibrous layer with a pure liquid of the same composition as the vapor, evaporating moisture from said layer as the fluid passes therethrough to further lower the temperature of the fluid below the fluid temperature in its saturated condition, transmitting the heat loss by the evaporation of moisture within said layer to said thermally conducting member to maintain said member at a temperature less than the temperature of the saturated fluid being advanced into contact therewith, and recovering condensate from the thermally conducting member in an amount greater than the amount of pure liquid added to the fibrous layer.

References Cited
UNITED STATES PATENTS

| | | | |
|---|---|---|---|
| 843,554 | 2/1907 | Schrader | 261—106 |
| 1,470,116 | 10/1923 | Gray | 55—90 X |
| 2,259,762 | 10/1941 | McKee | 203—89 X |
| 3,006,436 | 10/1961 | Starbuck et al. | 261—95 X |
| 3,303,634 | 2/1967 | Berrian | 55—269 X |
| 601,677 | 4/1898 | Rappleye | 55—90 |
| 2,021,903 | 11/1935 | Tapie | 261—103 |
| 2,708,835 | 5/1955 | Nigro | 261—101 X |

JOHN ADEE, Primary Examiner

U.S. Cl. X.R.

203—10; 202—185 A, 187; 55—90, 267; 261—106